3,347,840
POLYMERIZATION PROCESS
Robert M. Manyik, St. Albans, and Wellington E. Walker and Thomas P. Wilson, Charleston, W. Va., assignors to Union Carbide Corporation, a corporation of New York
No Drawing. Filed June 16, 1964, Ser. No. 375,644
9 Claims. (Cl. 260—94.9)

This invention relates to an improved process for the polymerization of ethylene.

Many processes are known for the polymerization of ethylene to solid polymers having a wide range of known utility. Among the most recent discoveries in this field has been the discovery that mono-unsaturated alpha-olefins can be polymerized to solid high molecular weight polymers by contacting the alpha-olefins with a catalyst complex of a poly(hydrocarbylaluminum oxide) and a transition metal compound of the metals of Groups IV–A, V–A, and VI–A of the Periodic Chart of the Atoms. It was also found that this catalyst complex can, if desired, contain a compound of the metals of Groups IA, IIA and IIIB as a third component; however, this third component was found not to be essential to the operability of the process and its main purpose appears to be as a scavanger for trace impurities present in the reaction mixture. The Periodic Chart referred to is the 1956 Edition published by W. M. Welch Manufacturing Company, Chicago, Ill. The poly(hydrocarbylaluminum oxide) component used in the above-described catalyst complex was produced by the addition of a defined amount of water to an anhydrous solution of a hydrocarbylaluminum compound in a dry, inert, organic solvent. While this recently discovered process has shown many advantages over the previously known processes, one of the disadvantages has been the conversion of appreciable amounts of ethylene to butene-1 or hexene-1 with some of the catalyst combinations. This tendency to produce low molecular weight oligomers such as the dimers and trimers is disadvantageous for two reasons, it represents a loss of monomer, and the butene-1 or hexene-1 produced copolymerizes with the ethylene to produce a branched polymer having a lower density than that of the unbranched polymer. In some instances the conversion of ethylene, to hexene-1 has been as high as 20 percent by weight of the ethylene charged.

It has now been found that the conversion of ethylene to hexene-1 observed with certain catalyst compositions can be retarded drastically by the addition to the polymerization reaction of small amounts of certain unsaturated compounds.

The hexene-1 or oligomer retardants are the unsubstituted and mono-substituted butadiene compounds of the formula:

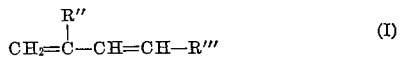

$$CH_2=\overset{R''}{\underset{|}{C}}-CH=CH-R'''\qquad(I)$$

wherein $R''$ is hydrogen, halogen (chlorine, bromine, iodine, fluorine), alkoxyl of 1 to about 5 carbon atoms, aryl, or alkyl of 1 to about 5 carbon atoms, and $R'''$ is hydrogen, aryl, or alkyl of from 1 to about 6 carbon atoms, with the proviso that said retardants contain only one of said $R''$ and $R'''$ radicals in the molecule. Also useful as retardants are cyclohexadiene-1,3 and 3-ethylidenecyclohexene. Compounds of Formula I are, for example, butadiene, 2-chlorobutadiene-1,3, 2-methoxybutadiene-1,3, 2-propoxybutadiene-1,3, 2-pentoxybutadiene-1,3, 2-isopropoxybutadiene-1,3, 2-methylbutadiene-1,3. 2-t-butylbutadiene-1,3, 2-tolybutadiene-1,3, 2-phenylbutadiene-1,3, pentadiene-1,3, octadiene-1,3, decadiene-1,3, 5-methylhexadiene-1,3, 6,6-dimethylheptadiene-1,3, 4-phenylbutadiene-1,3, and the like.

Other compounds such as cyclohexene, phenylacetylene, cyclooctadiene-1,5 and styrene show some effect but not of sufficient magnitude to consider them to be practical; still others such as cyclopentadiene and 2,2′-bipyridyl appear to act as catalyst poisons and no polymerization is observed, and still others such as dimethoxyethane tended to increase the amount of ethylene converted to hexene-1.

The concentration of the retardant in the polymerization reaction mixture can be from about 1 part per million or less to about 1500 parts per million or more and it is preferably from about 5 parts per million to about 400 parts per million based on the total reaction mixture since high concentrations tend to reduce the rate of reaction.

The most desirable amount of a specific retardant to be used in the process will vary depending upon the individual reaction system employed; i.e., the solvent, the catalyst, the pressure, the temperature, and other variables. This can be readily ascertained by those skilled in the art in view of the teachings herein.

The retardant can be introduced into the reaction by any convenient manner, for example, by addition to the ethylene monomer or to the solvent before introduction thereof into the reactor.

The use of the retardants of this invention has decreased the amount of ethylene converted to butene-1 or hexene-1 to commercially insignificant amounts below about 5 percent and in most instances below about 3 percent of the ethylene charged; whereas in the absence of the retardant conversion of ethylene to butene-1 or hexene-1 ranged from about 13 percent to about 20 percent of the ethylene charged has been observed. It has also been observed that increasing the temperature of the polymerization reaction decreases the amount of hexene-1 produced; this appears to be valid whether or not a retardant is used but the use of the retardant is distinctly advantageous over the use of an elevated temperature.

The polymerization reaction and the production of the poly(hydrocarbylaluminum oxide) are carried out in a dry, inert hydrocarbon solvent. These solvents are well known to those skilled in the ethylene polymerization art and include among others the saturated aliphatic compounds such as butane, pentane, hexane, heptane, octane, isooctane, the purified kerosenes, etc.; the cycloaliphatics such as cyclobutane, cyclopentane, cyclohexane, cycloheptane, methylcyclopentane, dimethylcyclopentane, etc.; and the like. The major requirements in the selection of a solvent are that it be liquid at the reaction temperature, that it does not react with water even though it will dissolve a trace amount of water, that it does not react with the hydrocarbylaluminum compound or poly(hydrocarbylaluminum oxide) or interfere with the desired reactions in any manner.

The poly(hydrocarbylaluminum oxide) can be produced by the slow incremental addition of from about 0.5 mole to about 1.25 moles of water, preferably from about 0.85 to about 1.1 moles of water, per mole of hydrocarbylaluminum compounds in an inert, anhydrous hydrocarbon solvent at a temperature of from about 0° C. to about 100° C., preferably from about 10° C. to about 65° C.

The poly(hydrocarbylaluminum oxide) can also be produced by contacting an organic solvent solution of the hydrocarbylaluminum compound with a water-wetted solvent at temperatures from about 5° C. up to the boiling point of the solvent at the pressure used, preferably at temperatures from about 20° C. to about 100° C. The mole ratio of water to hydrocarbylaluminum compound can vary from about 0.5:1 to about 1.4:1; preferably from about 0.95:1 to about 1.3:1 and most preferably from about 0.97:1 to about 1.1:1. This latter procedure for producing the poly(hydrocarbylaluminum oxide) is the preferred process. It gives a catalyst component which is much more reactive, polymerizes the olefinic monomer at a more rapid rate, and produces polymer slurries having higher total solids content and fluidity. In either of the above procedures the pressure can be subatmospheric, atmospheric, or superatmospheric.

The hydrocarbylaluminum compounds used as starting materials in the production of the poly(hydrocarbylaluminum oxides) have the general formula:

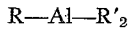

wherein R is a hydrocarbyl radical as hereinafter defined and R' represents either a hydrocarbyl radical such as an alkyl radical or an aryl radical having the same meaning as hereinafter defined for the variable R or it can also be a hydrogen atom. The suitable hydrocarbylaluminum compounds are those which have at least one aluminum to carbon bond such as the trialkylaluminum compounds, the triarylaluminum compounds, the dialkylaluminum hydrides, the diarylaluminum hydrides, the alkylarylaluminum hydrides, the monoalkylaluminum dihydrides, the monoarylaluminum dihyrides, and the like. Illustrative thereof one can mention trimethylaluminum, triethylaluminum, tripropylaluminum, triisoproplyaluminum, tri-n-butylaluminum, triisobutylaluminum, trihexylaluminum, trioctylaluminum, tridecylaluminum, tridodecylaluminum, tribenzylaluminum, triphenylaluminum, tritolylaluminum, trinaphthylaluminum, dimethylaluminum hydride, diisobutylaluminum hydride, dihexylaluminum hydride didecylaluminum hydride, diphenylaluminum hydride, dixylyaluminum hydride, dinaphthylaluminum hydride, methylphenylaluminum monohydride, ethylnaphthylaluminum monohydride, methylaluminum dihydride, ethylaluminum dihydride, isobutylaluminum dihydride, octylaluminum dihydride, dodecylaluminum dihydride, phenylaluminum, dihydride, tolylaluminum dihydride, naphthylaluminum dihydride, and the like.

One method of producing the poly(hydrocarbylaluminum oxides) from the hydrocarbylaluminum compounds was previously shown to involve the bringing together of two hydrocarbon solvent streams, one stream being a hydrocarbon solvent solution of the hydrocarbylaluminum compound and the other stream being a water-containing hydrocarbon solvent stream; the mole ratio of water to hydrocarbylaluminum compound in said streams is most preferably of the order of about 1:1. In this method, however, the ratio can be varied from about 0.5:1 or lower to about 1.4:1 or higher; and is preferably from about 0.95:1 to about 1.3:1 and most preferably from about 0.97:1 to about 1.1:1. It was found that as this ratio was decreased below about 1:1 the conversion rate of monomer to solid polymer decreased at a fairly rapid rate and that the fluidity and total solids content of the polymerization reaction mixture also decreased; while the same effects were observed as the ratio was increased they were not of the same degree. Consequently, it is advantageous to operate within the preferred ratio range; particularly since it was found that when so operating there is no detectable trace of unreacted hydrocarbylaluminum compound in the mixture of poly(hydrocarbylaluminum oxide) and solvent. The concentration of hydrocarbylaluminum compound in the anhydrous hydrocarbon solvent is not critical and generally varies from about 0.01 to about 12 percent or more by weight; preferably it is from about 0.04 to about 0.4 percent by weight. The amount of water in the water-wetted hydrocarbon solvent can be varied up to that amount at which the hydrocarbon solvent selected is saturated with water. An amount of water in the hydrocarbon solvent above that at which the solvent is saturated at the particular temperature and pressure selected is preferably avoided since the presence of discrete droplets of water in the solvent is not particularly desirable. However, the amounts of each of the two hydrocarbon streams, the anhydrous hydrocarbon stream containing dissolved hydrocarbylaluminum compound and the water-wetted hydrocarbon stream, are controlled so that the ratio of water to hydrocarbylaluminum compound set forth above is met. As the two streams contact and intimately mix the reaction between the hydrocarbylaluminum compound and the water commences; to ensure completion of this reaction, the mixture can then be aged. This aging is most advantageously accomplished by passing the mixture through a tubular reactor; however, any other suitable means can be used such as a packed vessel or an agitator equipped vessel. The aging period can vary from a few minutes, or less, to several hours, or more, and is most readily and easily controlled by adjusting the length of the tubular reactor and the flow rate therethrough when the aging reactor is of a tubular nature. The means by which the aging time can be controlled are readily apparent to a skilled engineer. After the produced poly(hydrocarbylaluminum oxide) leaves the aging reactor it is conveyed to the polymerization reactor. It has generally been found that the use of fresh poly(hydrocarbylaluminum oxide) offers many advantages over the use of material which has been prepared and stored for a lengthy period of time; such advantages include the ability to obtain a polymer slurry which is still quite fluid at solids contents up to about 30 percent by weight, and an increase in the polymerization reaction rate. Fresh poly(hydrocarbylaluminum oxide) is material which is used within about 10 to 90 minutes after the two solvent streams have been brought into contact with each other; this period necessarily includes the aging time. While fresh poly(hydrocarbylaluminum oxide) is preferred, polymerization is also achieved using material which has been aged for many months. Greater loss of activity after aging for long periods has been observed with the more concentrated solutions of than has been observed with dilute solutions of poly(hydrocarbylaluminum oxide). Aging can be at any temperature from about 5° C. up to the boiling point of the hydrocarbon solvent at the reactor pressure and is preferably at from about 20° C. to about 100° C. Temperature has been found to have a definite effect on aging and the temperature at which aging is effected has an affect on the properties of the polymers produced; high aging temperatures generally appear to produce polymers having higher melt indices. The wetting of the hydrocarbon solvent through a water-containing packed vessel or other suitable means and such procedures are known to the average skilled scientist or engineer.

The poly(hydrocarbylaluminum oxide) which is a component of the catalyst complex consists of units of the formula:

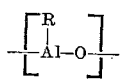

wherein R represents a hydrocarbyl radical containing from 1 to about 12 carbon atoms. Illustrative thereof are the alkyl radicals such as methyl, ethyl, propyl, isopropyl, butyl, isobutyl, t-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, benzyl, phenethyl, and the like; and the aryl radicals such as phenyl, tolyl, xylyl, butylphenyl, naphthyl, methylnaphthyl, and the like. In this application whenever the term "hydrocarbyl" is used it represents a saturated alkyl radical or an aryl radical as defined above.

Among the transition metal compounds of the metals of Groups IV-A, V-A, and VI-A which can be used as the second component of the catalyst composition useful in this invention are the compounds of the metals titanium, zirconium, hafnium, cerium, vanadium, niobium, tantalum, chromium, molybdenum, tungsten, thorium, and uranium. The suitable compounds can be represented by the formula $MX_n$ in which M represents the transition metal atom, X represents a halogen atom or an organic group, such as an alkoxy or ester radical containing up to about 20 carbon atoms or more, and $n$ is the valence state of the transitional metal. Illustrative of some of the transition metal compounds which can be used one can mention, for example, vanadium dichloride, vanadium trichloride, vanadium tetrachloride, vanadium trifluoride, vanadium tetrafluoride, vanadium pentafluoride, vanadium triiodide, titanium dibromide, titanium tribromide, titanium tetrabromide, titanium dichloride, titanium trichloride, titanium tetrachloride, titanium trifluoride, titanium tetrafluoride, titanium diiodide, titanium tetraiodide, zirconium dibromide, zirconium tribromide, zirconium tetrabromide, zirconium dichloride, zirconium trichloride, zirconium tetrachloride, zirconium tetrafluoride, zirconium tetraiodide, niobium pentabromide, niobium pentachloride, niobium pentafluoride, tantalum pentabromide, tantalum pentachloride, tantalum pentafluoride, chromous bromide, chromic bromide, chromous chloride, chromic chloride, chromous fluoride, chromic fluoride, molybdenum dibromide, molybdenum tribromide, molybdenum tetrabromide, molybdenum dichloride, molybdenum trichloride, molybdenum tetrachloride, molybdenum pentachloride, molybdenum hexafluoride, and the like. Among the organic compounds of the transition metals one can mention chromium acetate, chromium (III) oxy-2 - ethylhexanoate, chromium (III) 2 - ethylhexanoate, chromium (III) dichloroethylhexanoate, chromium (II) 2-ethylhexanoate, titanium (IV) 2-ethylhexanoate, chromium (III) isobutoxide, zirconyl acetate, uranyl butyrate, zirconyl tetrabutoxide, titanium tetraethoxide, dicyclopentadienyltitanium dichloride, dicyclopentadienyltitanium difluoride, dicyclopentadienylvanadium dichloride, vanadyl acetylacetonate, zirconyl acetylacetonate, chromium acetylacetonate, and the like. This transition metal compound can be added to the poly(hydrocarbylaluminum oxide) solution at any time after the latter has been produced, and it can be added in any convenient form, for example as a solution or slurry in the anhydrous hydrocarbon solvent; the preferred transistion metal compounds are the halogen-free compounds.

The composition of the catalyst complex is such that it contains from about 0.0002 to about 0.05 millimole of transition metal from the $MX_n$ compound and from about 0.2 to about 20 millimoles of aluminum from the poly(hydrocarbylaluminum oxide) compound per liter of inert hydrocarbon solvent present in the polymerization reactor. The mole ratio of transition metal to aluminum in the catalyst complex can be varied from about 1:30 to about 1:3000 or more, but it is preferably from about 1:100 to about 1:800.

Though scavengers are not necessary since all of the reaction components used will be of high purity, one can if desired make use of them. Included among the compounds suitable for use for this purpose are, with a few exceptions, compounds of the formula $MeR'_x$, wherein R' has the same meanings defined above, Me is a metal from the Groups I-A, II-A or III-B of the Periodic Chart, and $x$ is an integer corresponding to the valence of said metal. The exceptions are those compounds which may act as poisons. The suitable compounds are well know and innumerable examples will be found in "Linear and Stereoregular Addition Polymers," by N. G. Gaylord and H. F. Mark, published in 1959 by Interscience Publishers, Inc., New York, as well as in numberless technical papers and domestic and foreign patents in the field of olefin polymerization. When present the scavenger is used at concentrations of from about 0.01 to about 2 millimoles of the scavenger per liter of hydrocarbon solvent.

The polymerization reaction is preferably carried out in a continuous manner whereby the catalyst complex and hydrocarbon solvent are contacted with the monomers and modifiers in a polymerization reactor that is equipped with condensor means and recycling means. The polymerization can be carried out at temperatures of from about 0° C. up to the boiling point of the polymerization reaction mixture; preferred conditions are those at which sufficient solvent is present in the vapor phase so as to provide adequate cooling on condensation thereof and at which sufficient ethylene is dissolved in the liquid phase to ensure adequate reaction rates. The polymerization temperature is controlled by removing heat of reaction by volatilization of a portion of the solvent, cooling in the condensor, and returning cooled gaseous vapors and a small amount of condensate thereof to the polymerization reactor. In this manner not only is the polymerization reaction advantageously controlled, but there is no problem of ivory formation on the cooling means and very little indication of ivory formation on the reactor walls. It was observed that under a given set of reaction conditions the melt index of the polymer produced increased as the temperature was increased.

The pressure in the polymerization reactor can vary from atmospheric pressure to a pressure of about 100 atmospheres or higher up to 5000 atmospheres or more. The preferred pressure is from about 3 to about 20 atmospheres and is adjusted to permit sufficient reflux so as to maintain the temperature of the polymerization reaction within the range desired. It has been observed that at higher pressures or higher transition metal compound more hexene-1 is produced and that this tendency can be overcome by using a higher concentration of retardant within the range cited.

In the appended examples the following test procedures were employed:

Melt index—A.S.T.M. D1238–57T, at 190° C. and 44 p.s.i.g.
Flow rate—A.S.T.M. D1238–57T, at 190° C. and 440 p.s.i.g.
Flow rate ratio—flow rate/melt index
Density—A.S.T.M. 1505–57
Stiffness modulus—A.S.T.M. D638–56T
Elongation—A.S.T.M. D638–56T

Example 1

A first stream (390 parts by volume) of n-hexane having dissolved therein 140 parts per million by volume of water and a second stream (390 parts by volume) of n-hexane having dissolved therein 0.155 part by volume of triisobutylaluminum per hundred parts of solution were admixed in a conduit at such a rate that 6.08 millimoles per hour of water were combined and reacted with 4.84 millimoles per hour of triisobutylaluminum. The resulting reaction mixture, which now contained the poly(isobutylaluminum oxide) was aged at 25° C. for 20 minutes and a solution of chromic 2-ethylhexanoate in dry n-hexane was added thereto, at a rate of 15.7 micromoles per hour of the chromium compound. This catalytic mixture was conveyed to a polymerization reactor and polymerization was carried out at 73° C. at a pressure of 100 p.s.i.g. maintained by demand feeding of ethylene. The average residence time in the reactor was 1.2 hours. A slurry of polyethylene having a total solids content of 19.3 percent by weight was produced. Analysis of the recovered reaction mixture established that 7.0 weight percent of the charged ethylene has been converted to hexene-1. The polyethylene was separated and dried.

Example 2

Polyethylene was produced under conditions similar to those set forth in Example 1. However, the n-hexane solution of chromic 2-ethylhexanoate had dissolved therein butadiene at such concentration that there was present in the polymerization reaction mixture 324 parts per million by volume of said butadiene as the hexene-1 retardant. Analysis after polymerization indicated that only 1.25 weight percent of the ethylene charged had reacted to form hexene-1, which is an amount less than ⅕ of the amount formed when the butadiene retardant was omitted.

amount of ethylene converted to hexene-1; this is true whether or not a retardant is present but in the absence of a retardant the extent of hexene-1 formation renders the polymerization commercially unattractive for the production of high density polymers.

TABLE II

| Example | 3 | 3 | 3 | 4 | 5 | 5 | 6 | 7 |
|---|---|---|---|---|---|---|---|---|
| Temperature, °C | 73 | 63 | 53 | 73 | 73 | 63 | 73 | 73 |
| Catalyst concentration: | | | | | | | | |
| Chromic 2-ethylhexanoate, micromoles/liter | 5 | 6 | 8 | 9 | 5 | 10 | 7 | 9 |
| Poly(isobutylaluminum oxide) millimoles/liter | 2.3 | 2.3 | 2.3 | 2.3 | 3.1 | 2.2 | 2.3 | 2.3 |
| Hexene-1 retardant, p.p.m. by volume Butadiene | 0 | 0 | 0 | 500 | 23.6 | 44.5 | 6.8 | 500 |
| Total solids in slurry, wt. percent | 21.5 | 20.8 | 16.3 | 8.5 | 20 | 14.5 | 17.5 | 6.9 |
| Hexene-1 formed, wt. percent | 12.8 | 17.4 | 20.0 | 1.6 | 1.5 | 4.4 | 3.8 | 0.9 |
| Melt index, dgm./min | 1.3 | 0.15 | 0.14 | 1.5 | 0.9 | 1.7 | 1.0 | 5.5 |
| Density, gm./cc | 0.9515 | 0.9535 | 0.9495 | 0.9680 | 0.967 | 0.9602 | 0.9602 | 0.9705 |
| Flow rate ratio | 110 | 259 | 209 | 128 | 138 | 113 | 130 | 68 |
| Stiffness, p.s.i. ×10⁻³ | 130 | 130 | 119 | 183 | 184 | 158 | 154 | 175 |
| Elongation, percent | 200 | 171 | 273 | 32 | 110 | 85 | 170 | 5 |

The results of Examples 1 and 2 are summarized in Table I.

TABLE I

| Example | 1 | 2 |
|---|---|---|
| Catalyst concentration: Chromic 2-ethylhexanoate, micromoles/liter | 10 | 8 |
| Poly (isobutylaluminum oxide), millimoles/liter | 2.9 | 3.1 |
| Butadiene, p.p.m | 0 | 324 |
| Hexene-1 formed, wt. percent | 7.0 | 1.25 |
| Melt index, dgm./min | 0.6 | 7.9 |
| Density, gm./cc | 0.959 | 0.969 |
| Flow rate ratio | 130 | 61 |
| Stiffness, p.s.i. ×10⁻³ | 160 | 198 |
| Elongation, percent | 200 | 5 |

*Example 3*

Ethylene was polymerized at 73° C. in n-heptane as described in Example 1 in the absence of any retardant. It was found that 12.8 weight percent of the ethylene was converted to hexene-1. At a temperature of 63° C. conversion to hexene-1 was 17.4 weight percent, and at 53° C. it was 20.0 weight percent.

*Example 4*

Ethylene containing 1.5 percent by volume of hydrogen was polymerized at 73° C. as described in Example 2 using n-heptane as the solvent. The concentration of butadiene, the hexene-1 retardant, was 500 parts per million. It was found that only 1.6 weight percent of the ethylene was converted to hexene-1.

*Example 5*

Ethylene was polymerized at 73° C. in n-heptane as described in Example 2. The concentration of butadiene used was 23.6 parts per million. The amount of ethylene converted to hexene-1 was only 1.5 weight percent.

At a temperature of 63° C., and in the presence of 44.5 parts per million of butadiene 4.4 weight percent of the ethylene reacted to produce hexene-1.

*Example 6*

Ethylene was polymerized at 73° C. in n-heptane as described in Example 2. The butadiene concentration was 6.8 parts per million. The amount of ethylene converted to hexene-1 was only 3.8 weight percent.

*Example 7*

Ethylene was polymerized at 73° C. in n-heptane as described in Example 2. The butadiene concentration was 500 parts per million and the amount of ethylene that was converted to hexene-1 was only 0.9 weight percent.

Additional data and results for Examples 3 to 7 inclusive are set forth in Table II. As is evident from Examples 3 and 5, increasing the temperature decreases the

*Example 8*

Ethylene was polymerized at 73° C. in n-heptane as described in Example 2. The hexene-1 retardant used in this instance was cyclohexadiene-1,3 at a concentration of 9.5 parts per million. The amount of ethylene that was converted to hexene-1 was only 6.1 weight percent.

Similar results are obtained using 3-ethylidenecyclohexene as the oligomer retardant.

*Example 9*

Ethylene was polymerized in n-heptane as described in Example 2. The hexene-1 retardant used in this instance was 2-methoxybutadiene-1,3 at a concentration of 37 parts per million. No detectable amount of hexene-1 was formed.

*Example 10*

Ethylene was polymerized in n-heptane as described in Example 2. The hexene-1 retardant was 2-chlorobutadiene-1,3 (chloroprene) at a concentration of 2.5 parts per million. The amount of ethylene converted to hexene-1 was only 3.5 weight percent.

*Example 11*

Ethylene was polymerized in n-heptane as described in Example 2. The hexene-1 retardant was 2-chlorobutadiene-1,3 (chloroprene) at a concentration of 12.5 parts per million. The amount of ethylene converted to hexene-1 was only 1.1 weight percent.

*Example 12*

Ethylene was polymerized in n-heptane as described in Example 2. The hexene-1 retardant was 2-methylbutadiene-1,3 (isoprene) at a concentration of 27 parts per million. The amount of ethylene converted to hexene-1 was only 0.8 weight percent.

*Example 13*

Ethylene was polymerized in n-heptane as described in Example 2. The hexene-1 retardant was 2-methylbutadiene-1,3 (isoprene) at a concentration of 11 parts per million. The amount of ethylene converted to hexene-1 was only 2.7 weight percent.

*Example 14*

Ethylene was polymerized in n-heptane as described in Example 2. The hexene-1 retardant was pentadiene-1,3 (piperylene) at a concentration of 25 parts per million. The amount of ethylene converted to hexene-1 was only 1.6 weight percent.

Example 15

Ethylene was polymerized in n-heptane as described in Example 2. The hexene-1 retardant was pentadiene-1,3 (piperylene) as a concentration of 10 parts per million. The amount of ethylene converted to hexene-1 was only 4.0 weight percent.

Example 16

Ethylene was polymerized in n-heptane as described in Example 2. The hexene-1 retardant was 2-tertiarybutylbutadiene-1,3 at a concentration of 40 parts per million. The amount of ethylene converted to hexene-1 was only 2.1 weight percent.

Example 17

Ethylene was polymerized in n-heptane as described in Example 2. The hexene-1 retardant was 2-tertiarybutylbutadiene-1,3 at a concentration of 16 parts per million. The amount of ethylene converted to hexene-1 was only 5.1 weight percent.

Additional data and results for Examples 8 to 17 inclusive are set forth in Table III. As is seen the retardants have a definite effect on decreasing the amount of hexene-1 formed.

TABLE III

| Example | 8 | 9 | 10 | 11 | 12 | 13 | 14 | 15 | 16 | 17 |
|---|---|---|---|---|---|---|---|---|---|---|
| Catalyst concentration: | | | | | | | | | | |
| Chromic 2-ethylhexanoate, micromoles/liter | 8 | -- | 8 | 8 | 8 | 8 | 8 | 8 | 8 | 8 |
| Poly(isobutylaluminum oxide) millimoles/liter | 2.3 | -- | 2.7 | 2.7 | 2.7 | 2.7 | 2.6 | 2.6 | 2.7 | 2.7 |
| Hexene-1 retardant p.p.m. by volume: | | | | | | | | | | |
| Cyclohexadiene-1,3 | 9.5 | -- | -- | -- | -- | -- | -- | -- | -- | -- |
| 2-methoxybutadiene-1,3 | -- | 37 | -- | -- | -- | -- | -- | -- | -- | -- |
| 2-chlorobutadiene-1,3 | -- | -- | -- | 2.5 | 12.5 | -- | -- | -- | -- | -- |
| 2-methylbutadiene-1,3 | -- | -- | -- | -- | -- | 2.7 | 11 | -- | -- | -- |
| Pentadiene-1,3 | -- | -- | -- | -- | -- | -- | -- | 25 | 10 | -- |
| 2-tertiarybutylbutadiene-1,3 | -- | -- | -- | -- | -- | -- | -- | -- | 40 | 16 |
| Total solids in slurry, wt. percent | 14.7 | 5.9 | 13.7 | 11.2 | 11.9 | 12.4 | 11.2 | 13.6 | 11.3 | 10.2 |
| Hexene-1 formed, wt. percent | 6.1 | 0 | 3.5 | 1.1 | 0.8 | 2.7 | 1.6 | 4.0 | 2.1 | 5.1 |
| Melt index, dgm./min | 10 | 0.44 | 0.25 | 1.2 | 0.82 | 1.3 | 1.3 | 1.1 | 1.2 | 0.84 |
| Density, gm./cc | 0.9599 | 0.9693 | 0.963 | 0.968 | 0.970 | 0.965 | 0.969 | 0.964 | -- | -- |
| Flow rate ratio | 60 | 144 | 219 | 123 | 168 | 125 | 116 | 135 | 156 | 158 |
| Stiffness, p.s.i. ×10⁻³ | 155 | 172 | 166 | 190 | 180 | 175 | 189 | 166 | 175 | 171 |
| Elongation, percent | 8 | 30 | 480 | 70 | 65 | 105 | 190 | 145 | 45 | 105 |

The copolymerization of hexene-1 and its presence in the polymer can be confirmed by infrared analysis to show the presence of pendant butyl groups on the polymer chain. Its presence is also evidenced by a decrease in the density of the polymer and it has been observed that the greater the concentration or amount of hexene-1 in the reaction system the lower is the density of the polyethylene produced. Thus, the amount of butene-1 or hexene-1 present affords a convenient means for controlling the density of the polymer and either by adding butene-1 or hexene-1 to the reaction mixture or by using a smaller amount of the retardant to obtain a greater conversion of ethylene to butene-1 or hexene-1 one can control the density of the polyethylene produced.

What is claimed is:

1. A process for producing polyethylene by the polymerization of ethylene in contact with a catalyst complex consisting of the reaction product of a poly(hydrocarbylaluminum oxide) containing units of the formula:

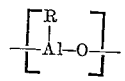

and a transition metal compound selected from the group consisting of the transition metals of Groups IV-A, V-A, and VI-A wherein R is a member selected from the group consisting of alkyl and aryl radicals having from 1 to 12 carbon atoms, and an oligomer retardant selected from the group consisting of (a) a compound of the formula:

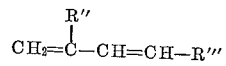

wherein R″ is selected from the group consisting of hydrogen, halogen, alkoxyl containing from 1 to about 5 carbon atoms, aryl, and alkyl containing from 1 to about 5 carbon atoms and R‴ is selected from the group consisting of hydrogen, aryl, and alkyl containing from 1 to about 6 carbon atoms, with the proviso that said compound contains only one of said R′ and R″ substituents in the molecule, (b) cyclohexadiene-1,3, and (c) 3-ethylidenecyclohexene; said retardant being at a concentration of from about 1 to about 1500 parts per million based on the total reaction mixture.

2. The process of claim 1 wherein said oligomer retardant is butadiene at a concentration of from 5 to 400 parts per million.

3. The process of claim 1 wherein said oligomer retardant is cyclohexadiene-1,3 at a concentration of from 5 to 400 parts per million.

4. The process of claim 1 wherein said oligomer retardant is 2-methoxybutadiene-1,3 at a concentration of from 5 to 400 parts per million.

5. The process of claim 1 wherein said oligomer retardant is 2-chlorobutadiene-1,3 at a concentration of from 5 to 400 parts per million.

6. The process of claim 1 wherein said oligomer retardant is 2-methylbutadiene-1,3 at a concentration of from 5 to 400 parts per million.

7. The process of claim 1 wherein said oligomer retardant is pentadiene-1,3 at a concentration of from 5 to 400 parts per million.

8. The process of claim 1 wherein said oligomer retardant is 2-tertiarybutylbutadiene-1,3 at a concentration of from 5 to 400 parts per million.

9. The process of claim 1 wherein the catalyst complex is the reaction product of poly(isobutylaluminum oxide) and chromic 2-ethylhexanoate.

References Cited
UNITED STATES PATENTS 3,231,550  1/1966  Manyik et al. _____ 260—88.2
3,242,099  3/1966  Manyik et al. _____ 252—429

JOSEPH L. SCHOFER, *Primary Examiner.*

M. B. KURTZMAN, *Assistant Examiner.*